United States Patent
Shen et al.

(10) Patent No.: US 10,374,275 B2
(45) Date of Patent: Aug. 6, 2019

(54) PLUGGABLE RECEIVER SPLITTER FOR TWO-TRANSMITTER TWO-RECEIVER MICROWAVE DIGITAL RADIOS

(71) Applicant: ZTE CORPORATION, Shenzhen (CN)

(72) Inventors: Ying Shen, Chapel Hill, NC (US); Edwin Nealis, Cary, NC (US); Zhiping Feng, Chapel Hill, NC (US); Zhuo Li, Xi'an (CN); Shawn Walsh, Cary, NC (US); Thanh H. Nguyen, Chapel Hill, NC (US)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/735,904

(22) PCT Filed: Jun. 10, 2016

(86) PCT No.: PCT/US2016/037026
§ 371 (c)(1),
(2) Date: Dec. 12, 2017

(87) PCT Pub. No.: WO2016/201330
PCT Pub. Date: Dec. 15, 2016

(65) Prior Publication Data
US 2019/0006727 A1    Jan. 3, 2019

Related U.S. Application Data (60) Provisional application No. 62/175,132, filed on Jun. 12, 2015.

(51) Int. Cl.
*H01P 1/36*     (2006.01)
*H01P 5/04*     (2006.01)
(Continued)

(52) U.S. Cl.
CPC ............... *H01P 1/39* (2013.01); *H01P 1/213* (2013.01); *H01P 1/36* (2013.01); *H01P 3/123* (2013.01);
(Continued)

(58) Field of Classification Search
CPC .... H01P 1/36; H01P 1/39; H01P 3/123; H01P 5/12; H04B 1/44; H01Q 1/52
(Continued)

(56) References Cited

U.S. PATENT DOCUMENTS

| | | | |
|---|---|---|---|
| 3,324,419 A | 6/1967 | Kuroda et al. | |
| 3,636,452 A * | 1/1972 | Nuding | H04B 7/145 333/1.1 |

(Continued)

FOREIGN PATENT DOCUMENTS

| | | |
|---|---|---|
| GB | 835575 A | 5/1960 |
| KR | 20070105158 A | 10/2007 |

OTHER PUBLICATIONS

ZTE Corporation, International Search Report and Written Opinion, PCT/US2016/037026, dated Sep. 28, 2016, 8 pgs.
(Continued)

*Primary Examiner* — Ganiyu A Hanidu
(74) *Attorney, Agent, or Firm* — Duane Morris LLP (57) ABSTRACT

A circulator plate for a microwave radio system is disclosed. The circulator plate includes a circulator including a first port, a second port, and a third port; a first isolator including an input port and an output port; a second isolator including an input port and an output port; and a splitter including an input port, a first output port, and a second output port. The output port of the first isolator is coupled to the first port of the circulator. The input port of the second isolator is coupled to the third port of the circulator. The input port of the splitter is coupled to the output port of the second isolator. The first output port of the splitter is configured to be coupled to a first receiver. The second output port of the splitter is configured to be coupled to a second receiver.

19 Claims, 7 Drawing Sheets

(51) Int. Cl.
*H04B 1/44* (2006.01)
*H01P 3/123* (2006.01)
*H01P 1/39* (2006.01)
*H01P 5/12* (2006.01)
*H01Q 1/52* (2006.01)
*H01P 1/213* (2006.01)
*H04B 1/525* (2015.01)

(52) U.S. Cl.
CPC ............... *H01P 5/04* (2013.01); *H01P 5/12* (2013.01); *H01Q 1/52* (2013.01); *H04B 1/44* (2013.01); *H04B 1/525* (2013.01)

(58) Field of Classification Search
USPC .......................................................... 455/83
See application file for complete search history.

(56) References Cited

U.S. PATENT DOCUMENTS

| | | | |
|---|---|---|---|
| 5,047,738 A | 9/1991 | Wong et al. | |
| 6,466,773 B1* | 10/2002 | Johnson | H04B 1/18 455/132 |
| 6,934,562 B1* | 8/2005 | Wilding | H01Q 1/246 375/136 |
| 7,602,333 B2* | 10/2009 | Hiramatsu | H01Q 13/24 342/134 |
| 2005/0085209 A1* | 4/2005 | Hiramatsu | H01P 3/165 455/328 |
| 2007/0064835 A1* | 3/2007 | Auranen | H04B 1/525 375/316 |
| 2008/0227410 A1 | 9/2008 | Cox | |
| 2009/0296790 A1* | 12/2009 | Cheung | H01P 1/38 375/219 |
| 2012/0081189 A1* | 4/2012 | Nealis | H01P 1/39 333/1.1 |
| 2012/0182906 A1* | 7/2012 | Knox | H04L 12/40013 370/278 |
| 2013/0206749 A1 | 8/2013 | Libman et al. | |
| 2014/0349595 A1 | 11/2014 | Cox | |
| 2015/0048983 A1 | 2/2015 | Nealis et al. | |
| 2015/0162974 A1* | 6/2015 | Trook | H04B 1/525 455/19 |
| 2018/0034486 A1* | 2/2018 | Pham | H04B 1/005 |

OTHER PUBLICATIONS

Supplementary European Search Report dated Jan. 23, 2019, in corresponding European Patent Application No. 16808445.7.

* cited by examiner

PLUGGABLE RECEIVER SPLITTER FOR TWO-TRANSMITTER TWO-RECEIVER MICROWAVE DIGITAL RADIOS

CROSS REFERENCE TO RELATED APPLICATIONS

This Application is a United States National Stage Application filed under 35 U.S.C. § 371 of PCT Patent Application Serial No. PCT/US2016/037026 filed on Jun. 10, 2016, which claims the benefit of and priority to U.S. Provisional Patent Application No. 62/175,132 filed on Jun. 12, 2015, which is hereby incorporated by reference in its entirety.

TECHNICAL FIELD

The present application generally relates to devices for microwave and wireless connections, more particularly, a pluggable receiver splitter for two-transmitter two-receiver microwave digital radios.

BACKGROUND

Microwave and wireless connections play an increasingly important role in the backhaul connectivity. In particular, a two-transmitter two-receiver (2T2R) digital microwave radio in one enclosure provides advantages such as increased capacity and coverage of microwave radios and reduced cost over the traditional one-transmitter one-receiver (1T1R) system design. A typical 2T2R system includes an antenna coupling unit with integrated circulators and isolators, which is also referred to as "circulator plate". The conventional antenna coupling devices have a fixed structure and layout, which makes it difficult for the same circulator plate to support a 2T2R digital microwave radio with flexible coupling factors and reduced insertion loss.

SUMMARY

An object of the present application is to develop a circulator plate for a microwave radio system that can support a 2T2R digital microwave radio with flexible coupling factors.

In some implementations, because the filters in the 2T2R digital microwave radios can be separated, a receiver splitter (e.g., splitter 140 of FIG. 1) is integrated on a circulator plate (e.g., circulator plate 104 of FIG. 1) as described herein. By moving the receiver splitter from a PCB board (e.g., PCB board 102 of FIG. 1) to the circulator plate, the insertion loss of the receiver splitter is reduced by, e.g., 0.5 dB.

In some implementations, the receiver splitter is comprised of a ridged-waveguide and has a plurality of ridges (or pins, teeth, etc.), which periodically change the internal height of the waveguide. The ridged-waveguide is used to replace a rectangular waveguide to reduce the size of the circulator plate in 6 GHz to 8 GHz frequency band. A compact ridged-waveguide directional splitter is disclosed herein to integrate the receiver splitter into the circulator plate. In some implementations, the ridged-waveguide including the receiver splitter is used in the frequency band from 5.9 GHz to 7.5 GHz. The structure of the ridged-waveguide as disclosed herein can also be used in other frequency bands.

In some implementations, the receiver splitter as disclosed herein provides variable coupling factors, e.g., 3 dB, 6 dB, and 10 dB, without changing the PCB board in the digital microwave radios. As disclosed herein, variable coupling factors are obtained by switching a pluggable coupling section, i.e., the pluggable insertion plate, in the receiver splitter.

In accordance with some implementations, a circulator plate for a microwave radio system includes a circulator including a first port, a second port, and a third port, a first isolator including an input port and an output port, a second isolator including an input port and an output port, and a splitter including an input port, a first output port, and a second output port. The second port of the circulator is configured to be coupled to an antenna. The output port of the first isolator is coupled to the first port of the circulator. The input port of the second isolator is coupled to the third port of the circulator. The input port of the splitter is coupled to the output port of the second isolator. The first output port of the splitter is configured to be coupled to a first receiver. The second output port of the splitter is configured to be coupled to a second receiver.

In accordance with some implementations, a two-transmitter two-receiver wireless communication system includes a first receiver, a second receiver, a first transmitter, a second transmitter, and an antenna coupling unit configured to be coupled to the first receiver, the second receiver, the first transmitter, the second transmitter, and an antenna. The antenna coupling unit includes a circulator including a first port, a second port, and a third port, a first isolator including an input port and an output port, a second isolator including an input port and an output port, and a splitter including an input port, a first output port, and a second output port. The second port of the circulator is configured to be coupled to the antenna. The output port of the first isolator is coupled to the first port of the circulator. The input port of the first isolator is configured to be coupled to the first transmitter and the second transmitter. The input port of the second isolator is coupled to the third port of the circulator. The input port of the splitter is coupled to the output port of the second isolator. The first output port of the splitter is configured to be coupled to a first receiver. The second output port of the splitter is configured to be coupled to a second receiver. The first isolator, the circulator, the second isolator, and the splitter are formed using a single circulator plate. The first receiver, the second receiver, the first transmitter, and the second transmitter are located outside the antenna coupling unit.

In accordance with some implementations, an antenna coupling unit for routing radio-frequency or microwave signals includes a single circulator plate and filters; a circulator formed using the single circulator plate; one or more isolators formed using the single circulator plate; and a splitter formed using the single circulator plate and coupled to an isolator.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles. Like reference numerals refer to corresponding parts.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of claims and the subject matter may be practiced without these specific details. For example, it will be apparent to one of ordinary skill in the art that the subject matter presented herein can be implemented on many types of radio communication systems.

Figure 1:
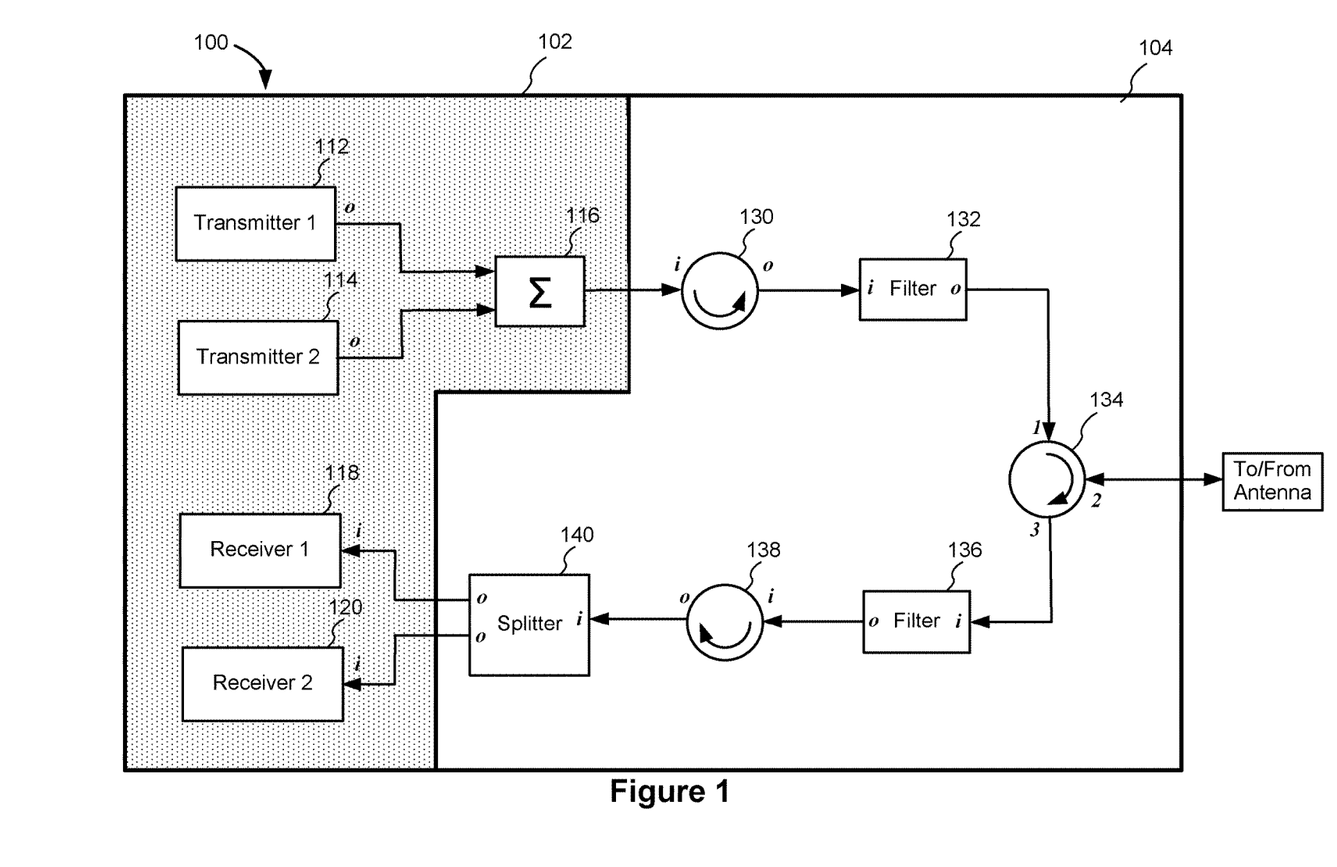
FIG. 1 is a schematic diagram illustrating a two-transmitter two-receiver (2T2R) device including a circulator plate integrated with a splitter in accordance with some implementations.

FIG. 1 is a schematic diagram illustrating a two-transmitter two-receiver (2T2R) digital microwave radio 100 including a circulator plate 104 including a splitter 140 in accordance with some implementations. Various implementation details of 2T2R digital microwave radios can be found in U.S. patent application Ser. No. 14/332,316, entitled "Compact Dual All-Outdoor Point-To-Point Microwave Radio Architecture" filed on Jul. 14, 2014, which is incorporated herein by reference in its entirety.

As shown in FIG. 1, the device 100 includes an isolator 130 that includes an input port (i) and an output port (o) that is distinct from the input port. In some implementations, the isolator 130 is configured to transmit microwave signals or radio-frequency (RF) signals received through the input port of the isolator 130 to the output port of the isolator 130. In some implementations, the isolator 130 is configured to suppress microwave signals or RF signals received through the output port of the isolator 130 from being output through the input port of the isolator 130.

As shown in FIG. 1, in some implementations, the device 100 also includes a circulator 134 that includes a first port (1), a second port (2), and a third port (3) that are distinct from each other. In some implementations, the first port of the circulator 134 is coupled to the output port of the isolator 130. In some implementations as shown in FIG. 1, the first port of the circulator 134 is coupled to the output port of the isolator 130 through one or more components (e.g., a filter 132). In some alternative embodiments (not shown), the first port of the circulator 134 is directly coupled to the output port of the isolator 130.

In some implementations, the second port of the circulator 134 is configured for coupling with an antenna as shown in FIG. 1. In some implementations, the second port of the circulator 134 is directly coupled to the antenna. In some alternative embodiments (not shown), the second port of the circulator 134 is coupled to the antenna through one or more components.

In some implementations, the circulator 134 is configured to route microwave signals or RF signals received through the first port to the second port of the circulator 134 (e.g., toward the antenna), and microwave signals or RF signals received through the second port (e.g., from the antenna) to the third port of the circulator 134.

As shown in FIG. 1, in some implementations, the device 100 further includes an isolator 138 that includes an input port (i) and an output port (o) that is distinct from the input port (i). The isolator 138 is distinct from the isolator 130. In some implementations, the isolator 138 is separate from the isolator 130.

As shown in FIG. 1, in some implementations, the input port of the isolator 138 is coupled to the third port of the circulator 134. In some implementations (not shown), the input port of the isolator 138 is directly coupled to the third port of the circulator 134. In some alternative implementations, the input port of the isolator 138 is coupled to the third port of the circulator 134 through one or more components (e.g., a filter 136).

In some implementations, the isolator 138 is configured to transmit microwave signals or RF signals received through the input port of the isolator 138 to the output port of the isolator 138. In some implementations, the isolator 138 is configured to suppress microwave signals or RF signals received through the output port from being output through the input port of the isolator 138.

In some implementations, the input port of the isolator 130 is configured to couple to output ports (o) of first and second RF or microwave transmitters (e.g., transmitters 112 and 114), and the output port of the isolator 138 is configured to couple to input ports (i) of first and second RF or microwave receivers (e.g., receiver 118 and receiver 120). In some implementations, the input port of the isolator 130 is coupled to output ports of the transmitters through one or more components (e.g., a combiner 116). In some implementations, the output port of the isolator 130 is coupled to input ports of the receivers through one or more components (e.g., a splitter 140).

As shown in FIG. 1, in some implementations, the circulator 134 receives the reception signals from the antenna through the second port and routes the reception signals toward the isolator 138. The reception signals pass through the isolator 138, and propagate toward the splitter 140. The splitter 140 splits the reception signals and sends a portion of the reception signals to the first receiver 118 and another portion of the reception signals to the second receiver 120.

In some implementations, the splitter 140 includes an input port (i) and two output ports (o) each of which is distinct from the input port. In some implementations, the input port of the splitter 140 is coupled to the output port of the isolator 138, the first output port of the splitter 140 is configured to be coupled to a first receiver 118, and the second output port of the splitter 140 is configured to be coupled to a second receiver 120.

Figure 2:
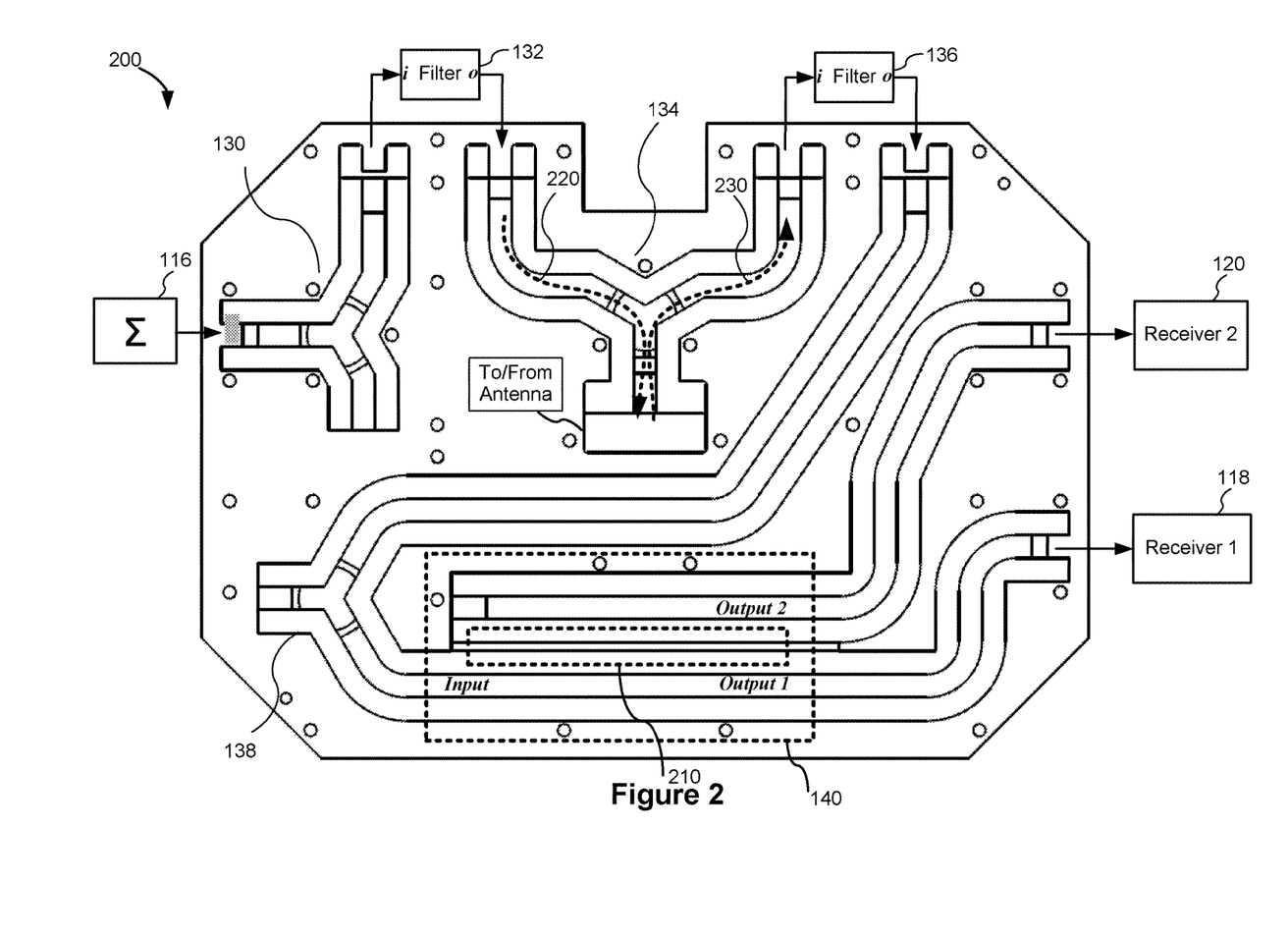
FIG. 2 is a top view of a circulator plate including a splitter in its physical shape in accordance with some implementations.

In some implementations, the isolator 130, the circulator 134, the isolator 138, and the splitter 140 are formed using a single plate (e.g., the circulator plate 104 in FIG. 1 or a circulator plate 200 in FIG. 2). As used herein, the single plate has a broad and flat shape. An exemplary single plate that is used for forming the isolator 130, the circulator 134, the isolator 138, and the splitter 140 are described below with respect to FIG. 2. In some implementations, the splitter 140 is formed on the circulator plate 104 to reduce the insertion loss of the splitter.

As shown in FIG. 1, in some implementations, the device 100 includes a filter 132 that includes an input port (i) and an output port (o) that is distinct from the input port. In some implementations, the input port of the filter 132 is coupled to the output port of the isolator 130 and the output port of the filter 132 is coupled to the first port of the circulator 134.

In some implementations, the filter 132 is a transmitter filter (also called a transmission filter). In some implementations, the filter 132 is configured to output RF or microwave signals that satisfy a predetermined RF or microwave band through the output port of the filter 132. In some implementations, the filter 132 is configured to suppress RF or microwave signals that do not satisfy the predetermined RF or microwave band from being output through the output port of the filter 132. In some implementations, the filter 132 is configured to send back (e.g., by reflection) RF or microwave signals that do not satisfy the predetermined RF or microwave band through the input port of the first filter 132. In some implementations, the filter 132 is a tunable filter and the corresponding predetermined RF or microwave band is tunable.

In some implementations, the device 100 also includes a filter 136 that includes an input port (i) and an output port (o) that is distinct from the input port. The filter 136 is distinct from the filter 132. In some implementations, the filter 136 is separate from the filter 132. In some implementations, the input port of the filter 136 is coupled to the third port of the circulator 134 and the output port of the filter 136 is coupled to the input port of the isolator 138.

In some implementations, the filter 136 is a receiver filter (also called a reception filter). In some implementations, the filter 136 is configured to output RF or microwave signals that satisfy a predetermined RF or microwave band through the output port of the filter 136. In some implementations, the filter 136 is configured to suppress RF or microwave signals that do not satisfy the predetermined radio-frequency or microwave band from being output through the output port of the filter 136. In some implementations, the filter 136 is a tunable filter and the corresponding predetermined RF or microwave band is tunable. In some implementations, the predetermined RF or microwave band associated with the filter 136 is distinct from the predetermined radio-frequency or microwave band associated with the filter 132. In some implementations, the predetermined RF or microwave band associated with the filter 136 does not overlap with the predetermined RF or microwave band associated with the filter 132.

As shown in FIG. 1, in some implementations, the device 100 includes a first transmitter 112, a second transmitter 114, a first receiver 118, and a second receiver 120. In some implementations, the first transmitter 112 is distinct and separate from the second transmitter 114. Similarly, in some implementations, the first receiver 118 is distinct and separate from the second receiver 120.

In some implementations, signals output from the first transmitter 112 and the second transmitter 114 are sent to a radio frequency (RF) combiner 116. The combiner 116 receives the signals from the first transmitter 112 and the second transmitter 114 through respective input ports (i) of the combiner 116 and routes the signals to the isolator 130 through the output port (o) of the combiner 116.

In some implementations, the transmitters 112 and 114, the receivers 118 and 120, the filters 132 and 136, and the combiner 116 are located outside the circulator plate 104. For example, the transmitters 112 and 114, the receivers 118 and 120, and the combiner 116 are formed on a PCB board 102 that is distinct from the circulator plate 104.

FIG. 2 is a top view of a circulator plate 200 including the splitter 140 in its physical shape in accordance with some implementations. As described below, different portions of the circulator plate 200 correspond to different elements in the circulator plate 104 as discussed with reference to FIG. 1.

In some implementations, the circulator plate 200 is made of a conductive material (e.g., aluminum) or a conductively plated material. As shown in FIG. 2, three Y channels are formed within the circulator plate 200. One of the Y channels operates as and corresponds to the circulator 134, and the three ports of the circulator 134 are coupled to the filter 132, the filter 136, and the antenna respectively as discussed with reference to FIG. 1. As shown in FIG. 2, the left branch 220 of the circulator 134 is used by the 2T2R radio (not shown) to transmit signals out and the right branch 230 is used by the 2T2R radio to receive signals. Each of the other two Y channels has a close end with a matched load so that these two Y channels operate as and correspond to the isolators 130 and 138 respectively. In some implementations, the two active ports of the isolator 130 are coupled to the combiner 116 and the filter 132 respectively as discussed with reference to FIG. 1. The two active ports of the isolator 138 are coupled to the filter 136 and the splitter 140 respectively as discussed with reference to FIG. 1.

As shown in FIGS. 1 and 2, the input port (input) of the splitter 140 is coupled to the output port of the isolator 138, and the first output port (output 1) of the splitter 140 is coupled to the first receiver 118, and the second output port (output 2) of the splitter 140 is coupled to the second receiver 120. The fourth port of the splitter 140 (which is a null port) is a close end configured with a match load to absorb the possible leakage of RF/microwave signals. The match load is made of absorber material such as ferrite materials.

As shown in FIG. 2, the splitter 140 includes an insertion plate 210 located between the first output port and the second output port. In some implementations, the insertion plate 210 splits the signals received by the 2T2R radio from the antenna port into two branches such that a portion of the received signals is output through the first output port toward the receiver 118, and the other portion of the signals is output through the second output port toward the receiver 120. In some implementations, the insertion plate 210 is plugged into the splitter 140 or the circulator plate 200, such that insertion plates of different configurations can be used to provide different coupling factors for the 2T2R radio.

Figures 3A, 3B:
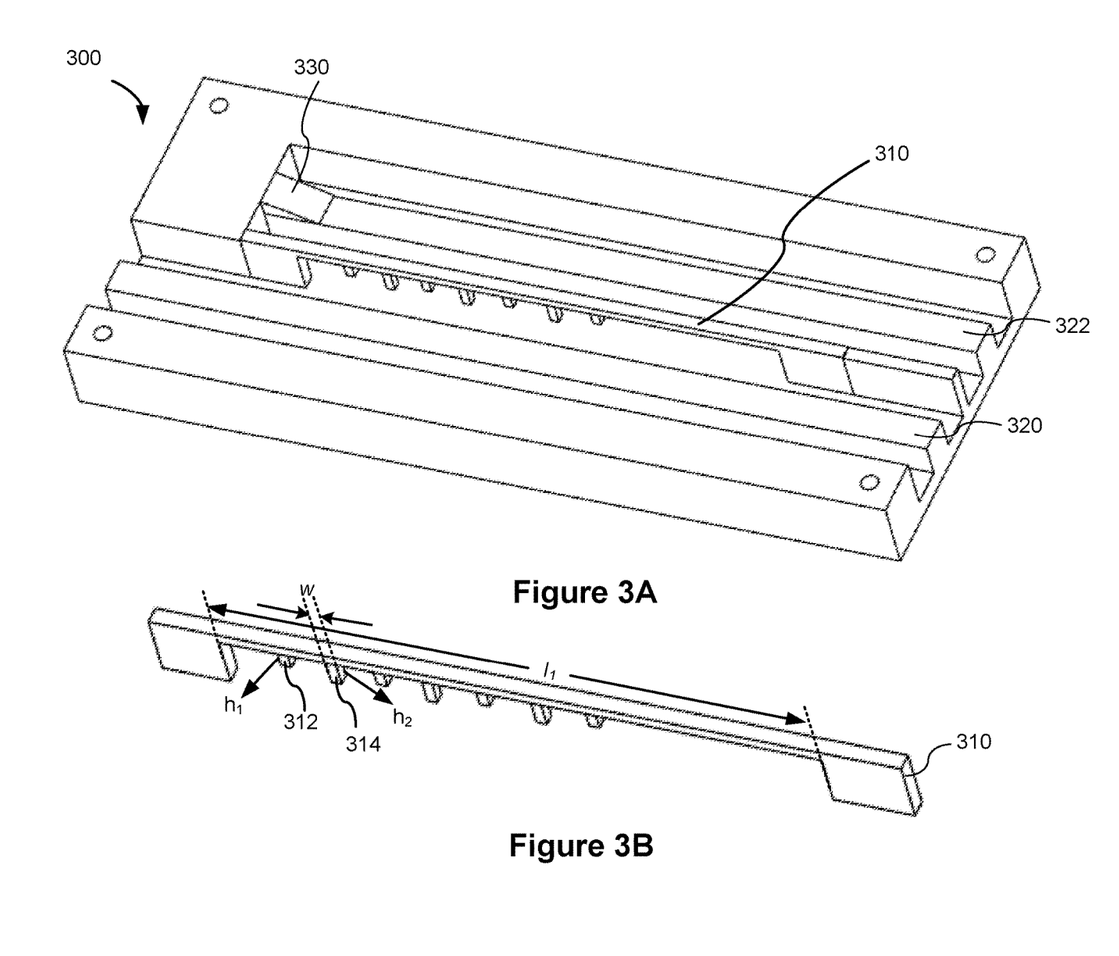
FIGS. 3A, 4A, and 5A are schematic drawings illustrating a splitter including different insertion plates in accordance with some implementations.
FIGS. 3B, 4B, and 5B are schematic drawings illustrating the different insertion plates in accordance with some implementations.
Figure 4A:
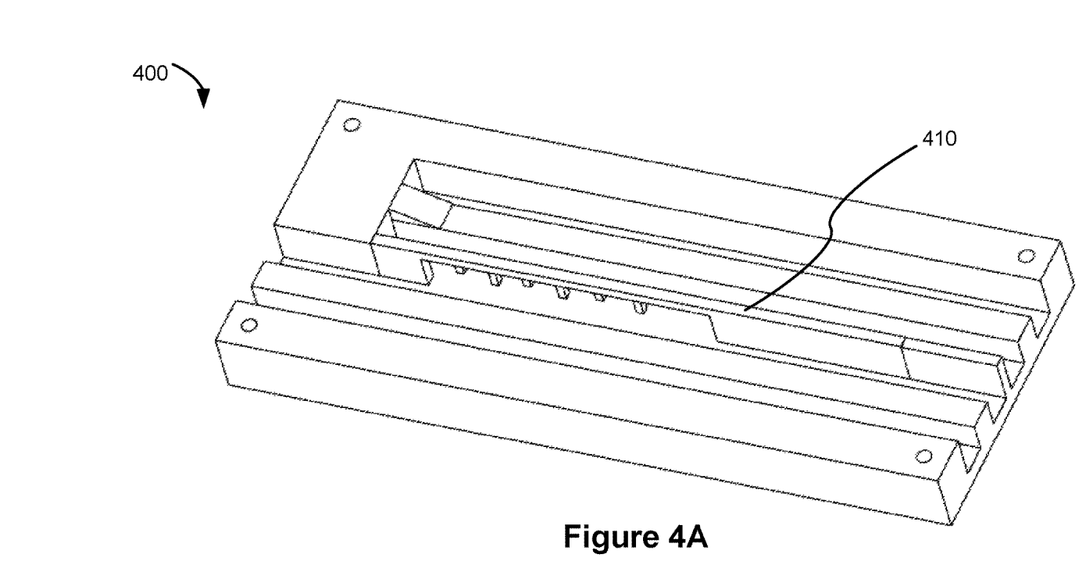
Figure 4B:
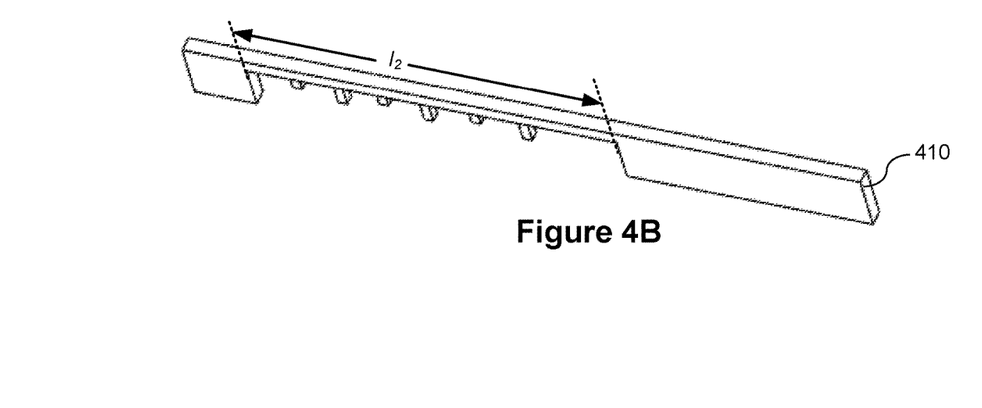
Figure 5A:
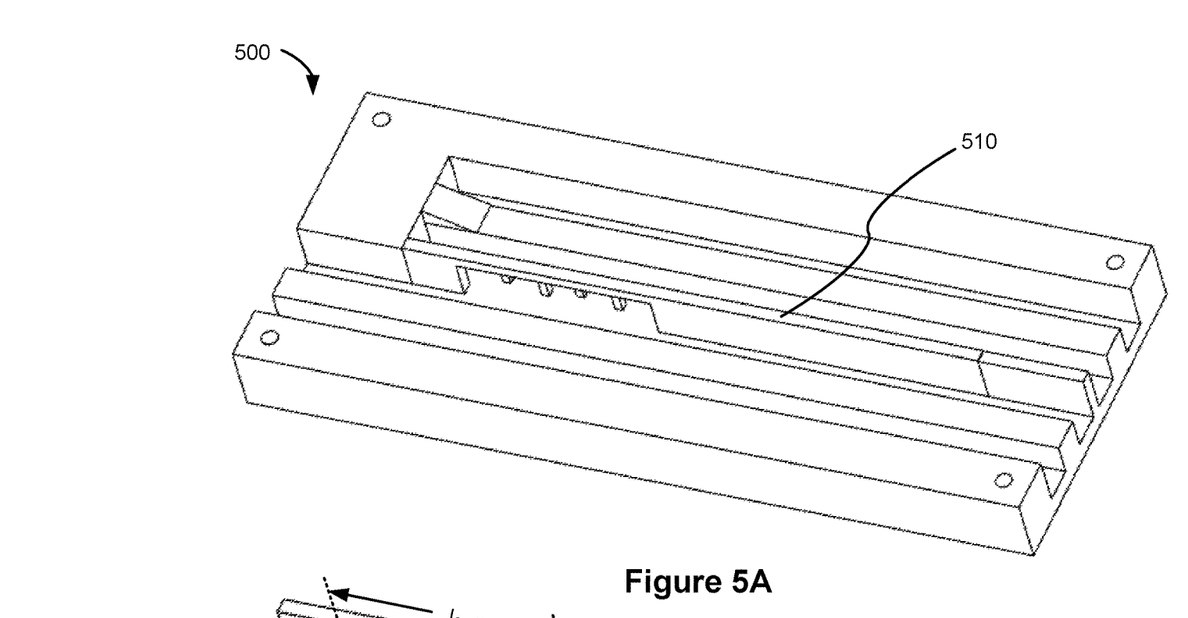
Figure 5B:
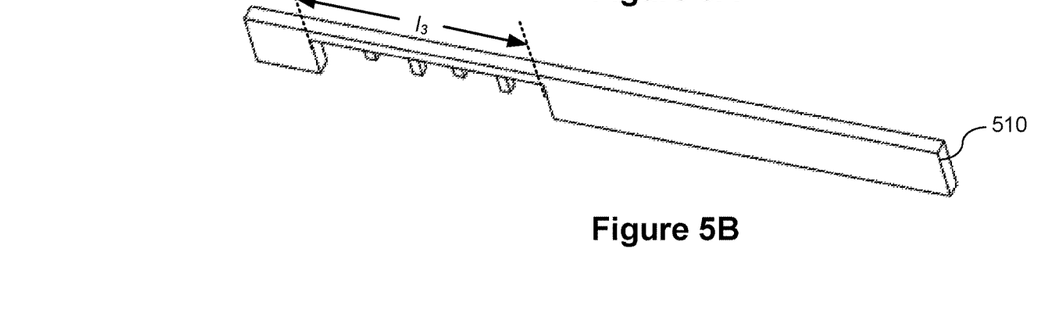

FIGS. 3A, 4A, and 5A are schematic drawings illustrating the splitters 300, 400, and 500 plugged in with different insertion plates respectively in accordance with some implementations. FIGS. 3B, 4B, and 5B are schematic drawings illustrating insertion plates 310, 410, and 510 that can be plugged in the splitter 140 respectively in accordance with some implementations.

Figure 6A:
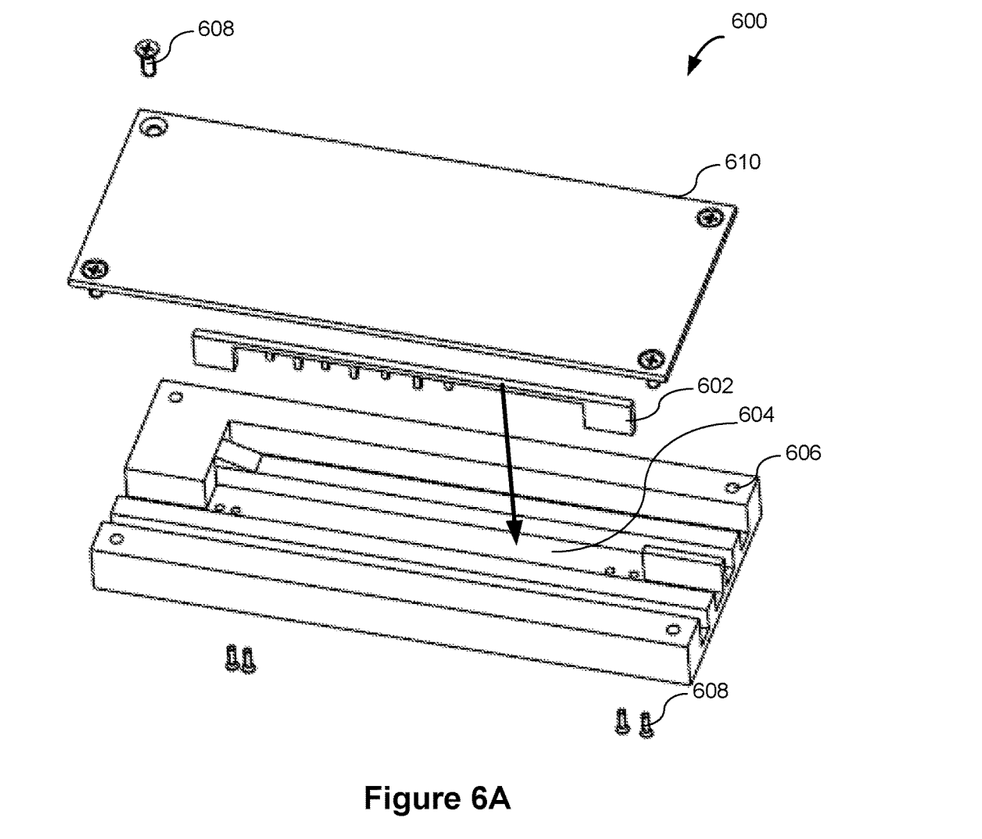
FIG. 6A is an exploded view of a splitter in accordance with some implementations.

In some implementations, the two ridge waveguide channels (e.g., channels 320 and 322 of FIG. 3A) corresponding to the two output ports of the splitter 140 are spaced apart from each other at a space of about 2.4 mm. Note that there is a match load 330 near the close end of the waveguide channel 322. Similar components are shown in FIGS. 4A, 5A, and 6A, respectively. In some implementations, an opening is formed along an elongated side of the insertion plate for signal coupling. A plurality of pins, e.g., metal pins, are located within the opening and protruding laterally from the elongated side of the insertion plate to increase the coupling factor.

In some implementations as shown in FIGS. 3B, 4B, and 5B, the plurality of pins comprise a group of long pins (e.g., pin 314) and a group of short pins (e.g., pin 312) that are alternately deployed along the elongated side of the insertion plate. In some implementations, the long pins have identical lengths, the short pins have identical lengths, and each long pin is longer than the short pin. In some implementations, a height (h1) of each short pin is between 2 mm and 3 mm, a height (h2) of each long pin is between 3.5 mm and 4.5 mm, and a width (w) of each of the plurality of pins is between 1 mm and 2.4 mm. For example, the long pin has a height (h2) of 4 mm, the short pin (h1) has a height of 2.5 mm, and the width (w) of each pin is 1.5 mm.

As shown in FIG. 3A, the insertion plate 310 is plugged in the splitter 300. As shown in FIG. 3B, in some implementations, a length (l1) of the opening in the insertion plate 310 is between 80 mm and 95 mm. In some implementations, the length (l1) of the opening in the insertion plate 310 is 88 mm. In some implementations as shown in FIGS. 3A-3B, the insertion plate 310 has seven pins located within the opening. For example as shown in FIG. 3B, three long pins 314 and four short pins 312 are alternately deployed in the opening of the insertion plate 310. In some implementations, the splitter 300 plugged in with the insertion plate 310 provides a coupling factor between 2.6 dB and 3.4 dB (e.g., 3 dB±0.36 dB). In some implementations, the splitter 300 plugged in with the insertion plate 310 provides a return loss less than 20 dB in a frequency range from 5.8 GHz to 7.8 GHz. In some implementations, the insertion loss of the splitter 300 plugged in with the insertion plate 310 is 3 dB±0.36 dB.

As shown in FIG. 4A, the insertion plate 410 is plugged in the splitter 400. As shown in FIG. 4B, a length (l2) of the opening in the insertion plate 410 is between 50 mm and 70 mm. In some implementations, the length (l2) of the opening in the insertion plate 410 is 60 mm. In some implementations, the insertion plate 410 has six pins located within the opening. For example as shown in FIG. 4B, three long pins and three short pins are alternately deployed in the opening of the insertion plate 410. In some implementations, the long pins and the short pins in the insertion plate 410 have similar dimensions as those discussed with reference to insertion plate 310 in FIG. 3B. In some implementations, the splitter 400 plugged in with the insertion plate 410 provides a coupling factor between 4.8 dB and 6.6 dB (e.g., 5.7 dB±0.9 dB). In some implementations, the splitter 400 plugged in with the insertion plate 410 provides a return loss less than 20 dB in a frequency range from 5.8 GHz to 7.8 GHz. In some implementations, the insertion loss of the splitter 400 plugged in with the insertion plate 410 is 1.35 dB±0.44 dB.

As shown in FIG. 5A, the insertion plate 510 is plugged in the splitter 500. As shown in FIG. 5B, a length (l3) of the opening in the insertion plate 510 is between 30 mm and 45 mm. In some implementations, the length (l3) of the opening in the insertion plate 510 is 37 mm. In some implementations, the insertion plate 510 has four pins located within the opening. For example as shown in FIG. 5B, two long pins and two short pins are alternately deployed in the opening of the insertion plate 510. In some implementations, the long pins and the short pins in the insertion plate 510 have similar dimensions as those discussed with reference to insertion plate 310 in FIG. 3B. In some implementations, the splitter 500 plugged in with the insertion plate 510 provides a coupling factor between 9.44 dB and 11.24 dB (e.g., 10.34 dB±0.9 dB). In some implementations, the splitter 500 plugged in with the insertion plate 510 provides a return loss of 20 dB in a frequency range from 5.4 GHz to 7.4 GHz. In some implementations, the insertion loss of the splitter 500 plugged in with the insertion plate 510 is 0.42 dB±0.20 dB.

In some implementations, the splitters 300, 400, and 500 are used as the splitter 140 as discussed with reference to FIGS. 1-2 by switching insertion plates 310, 410, and 510 respectively. In some implementations, the outside length, width, and height of the insertions plates 310, 410, and 510 are identical such that the insertions plates 310, 410, and 510 are pluggable and switchable in the splitter 140. By switching the insertion plates with different opening lengths and numbers of pins, the coupling factor and insertion loss of the splitter are changed. For example, by using an insertion plate with reduced opening length and reduced number of pins within the opening, and the insertion loss of the splitter is reduced, and the coupling factor in dB is increased.

Figure 6B:
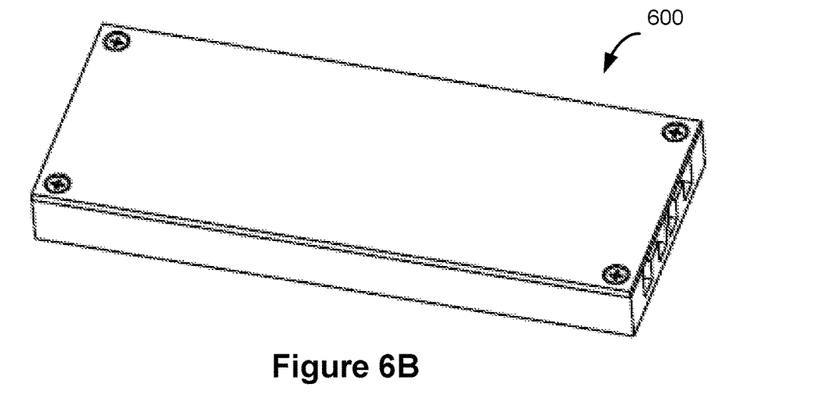
FIG. 6B is a perspective view of an assembled splitter in accordance with some implementations.

FIG. 6A is an exploded view of a splitter 600 in accordance with some implementations. FIG. 6B is a perspective view of an assembled splitter 600 in accordance with some implementations. As shown in FIGS. 6A-6B, the assembly of the splitter 600 includes aligning and plugging an insertion plate 602 in a slot 604 between the two channels (or two output ports) on a splitter body 606, and using one or more screws 608 to assemble the splitter body 606, which is plugged in with the insertion plate 602, with a splitter cover 610. In some implementations, by separating (e.g., unscrewing) the splitter cover 610 from the splitter body 606, insertion plates with different configurations (e.g., as discussed in various embodiments in FIGS. 3A-3B, 4A-4B, and 5A-5B) are switchable in the splitter 600 to provide variable coupling factors.

Figure 7:
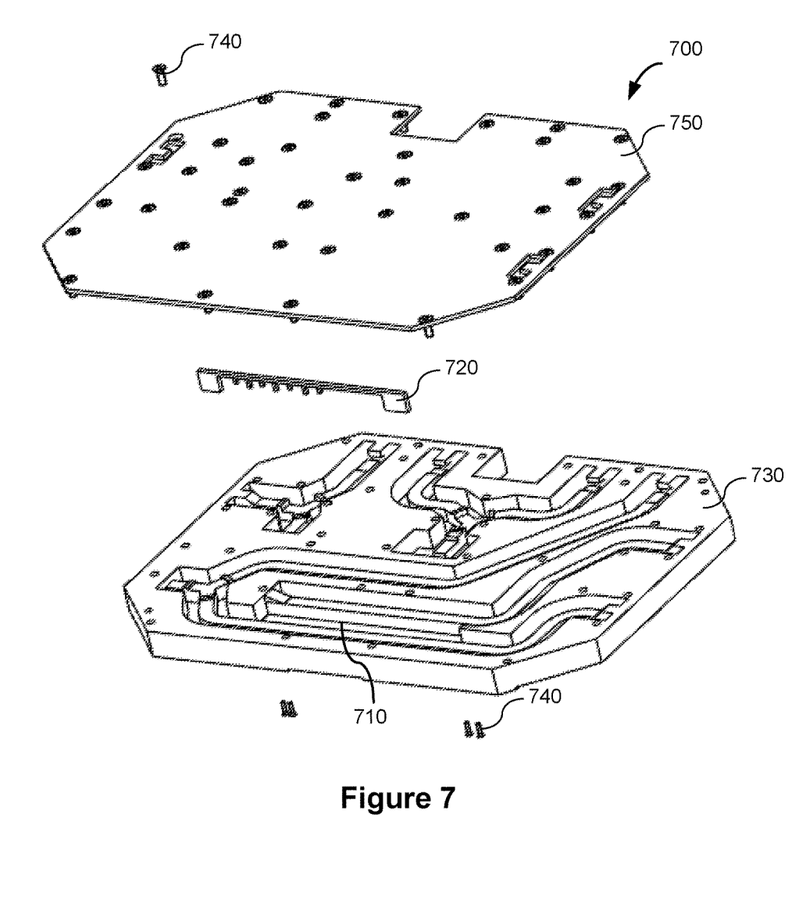
FIG. 7 is an exploded view of a circulator plate including a splitter and an insertion plate in accordance with some implementations.

FIG. 7 is an exploded view of a circulator plate 700 including a splitter 710 and an insertion plate 720 in accordance with some implementations. In some implementations, the assembly of the circulator plate 700 includes aligning and plugging the insertion plate 720 in a circulator plate body 730, and using one or more screws 740 to assemble the circulator plate body 730, which is plugged in with the insertion plate 720, with a circulator plate cover 750. In some implementations, insertion plates with different configurations (e.g., as discussed in various embodiments in FIGS. 3A-3B, 4A-4B, and 5A-5B) are switchable in the circulator plate 700 to provide variable frequency bands with different coupling factors.

Various embodiments as discussed in the present disclosure can be used in microwave digital radios, such as 2T2R microwave digital radios. As discussed above, the splitter with pluggable insertion plate can be designed for variable coupling factors to be used for different frequency bands. In some implementations, the splitter with pluggable insertion plate for variable coupling factors can be applied for the ridged-waveguide or the rectangular waveguide. In some implementations, the insertion loss is reduced by including the splitter on the circulator plate to replace the microstrip splitter on PCB. In some implementations, the cost is reduced by switching the insertion plates with different configurations in the splitter to provide different coupling factors. In some implementations, the architecture and design of the circulator plate is compact with a high integration level. In some implementations, the manufacturing process can also be simplified by having the splitter on the circulator plate instead of PCB.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc. may be used herein to describe various elements, these elements should not be limited by these terms. These terms are only used to distinguish one element from another. For example, a first port could be termed a second port, and, similarly, a second port could be termed a first port, without departing from the scope of the embodiments. The first port and the second port are both ports, but they are not the same port.

As used herein, the terms "couple," "coupling," and "coupled" are used to indicate that multiple components are connected in a way such that a first component of the multiple components is capable of receiving a signal from a second component of the multiple components, unless indicated otherwise. In some cases, two components are indirectly coupled, indicating that one or more components (e.g., filters, waveguides, etc.) are located between the two components but a first component of the two components is capable of receiving signals from a second component of the two components.

Many modifications and alternative embodiments of the embodiments described herein will come to mind to one skilled in the art having the benefit of the teachings presented in the foregoing descriptions and the associated drawings. Therefore, it is to be understood that the scope of claims are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The embodiments were chosen and described in order to best explain the underlying principles and their practical applications, to thereby enable others skilled in the art to best utilize the underlying principles and various embodiments with various modifications as are suited to the particular use contemplated.

What is claimed is:

1. A circulator plate for a microwave radio system, the circulator plate comprising:
a circulator including a first port, a second port, and a third port, wherein the second port of the circulator is configured to be coupled to an antenna;
a first isolator including an input port and an output port, wherein the output port of the first isolator is coupled to the first port of the circulator;
a second isolator including an input port and an output port, wherein the input port of the second isolator is coupled to the third port of the circulator; and
a splitter including an input port, a first output port, and a second output port, wherein:
the input port of the splitter is coupled to the output port of the second isolator,
the first output port of the splitter is configured to be coupled to a first receiver, and
the second output port of the splitter is configured to be coupled to a second receiver, wherein the splitter further comprises:
a pluggable insertion plate located between the first output port and the second output port of the splitter, and
wherein the splitter is configured to split signals received from the input port of the splitter into a first portion and a second portion, and transmit the first portion of the signals to the first receiver via the first output port and the second portion of the signals to the second receiver via the second output port.

2. The circulator plate of claim 1, wherein the insertion plate further comprises:
an opening formed along an elongated side of the insertion plate; and
a plurality of pins located within the opening and protruding laterally from the elongated side of the insertion plate.

3. The circulator plate of claim 2, wherein:
the plurality of pins comprise a first group of pins and a second group of pins;
the first group of pins are shorter than the second group of pins; and
the first group of pins and the second group of pins are alternately deployed along the elongated side of the insertion plate.

4. The circulator plate of claim 3, wherein a height of each pin in the first group of pins is between 2 mm and 3 mm, a height of each pin in the second group of pins is between 3.5 mm and 4.5 mm, and a width of each pin in the plurality of pins is between 1 mm and 2.4 mm.

5. The circulator plate of claim 2, wherein:
a length of the opening is between 80 mm and 95 mm;
a total number of the plurality of pins is seven; and
a coupling factor of the splitter is between 2.6 dB and 3.4 dB.

6. The circulator plate of claim 2, wherein:
a length of the opening is between 50 mm and 70 mm;
a total number of the plurality of pins is six; and
a coupling factor of the splitter is between 4.8 dB and 6.6 dB.

7. The circulator plate of claim 2, wherein:
a length of the opening is between 30 mm and 45 mm,
a total number of the plurality of pins is four, and
a coupling factor of the splitter is between 9.4 dB and 11.2 dB.

8. The circulator plate of claim 1, wherein:
the output port of the first isolator is configured to be coupled to an input port of a first filter, and the first port of the circulator is configured to be coupled to an output port of the first filter,
the third port of the circulator is configured to be coupled to an input port of a second filter, and the input port of the second isolator is configured to be coupled to an output port of the second filter, and
the first filter and the second filter are located outside the circulator plate.

9. The circulator plate of claim 1, wherein the first receiver and the second receiver are located outside the circulator plate.

10. The circulator plate of claim 1, wherein the input port of the first isolator is configured to be coupled to a combiner located outside the circulator plate.

11. The circulator plate of claim 1, wherein the first isolator, the circulator, the second isolator, and the splitter are formed using a single plate.

12. A two-transmitter two-receiver wireless communication system, the system comprising:
a first receiver;
a second receiver;
a first transmitter;
a second transmitter; and
an antenna coupling unit configured to be coupled to the first receiver, the second receiver, the first transmitter, the second transmitter, and an antenna, the antenna coupling unit comprising:
a circulator including a first port, a second port, and a third port, wherein the second port of the circulator is configured to be coupled to the antenna;
a first isolator including an input port and an output port, wherein the output port of the first isolator is coupled to the first port of the circulator, and the input port of the first isolator is configured to be coupled to the first transmitter and the second transmitter;

a second isolator including an input port and an output port, wherein the input port of the second isolator is coupled to the third port of the circulator; and a splitter including an input port, a first output port, and a second output port, wherein:

the input port of the splitter is coupled to the output port of the second isolator, the first output port of the splitter is configured to be coupled to the first receiver, the second output port of the splitter is configured to be coupled to the second receiver, wherein the first isolator, the circulator, the second isolator, and the splitter are formed using a single circulator plate, and wherein the first receiver, the second receiver, the first transmitter, and the second transmitter are located outside the antenna coupling unit.

13. The system of claim 12, wherein the splitter further comprises:

a pluggable insertion plate located between the first output port and the second output port of the splitter, wherein the insertion plate is configured to split signals received from the input port of the splitter into a first portion and a second portion, and transmit the first portion of the signals to the first receiver via the first output port and the second portion of the signals to the second receiver via the second output port.

14. The system of claim 12, wherein:

the output port of the first isolator is configured to be coupled to an input port of a transmitter filter, and the first port of the circulator is configured to be coupled to an output port of the transmitter filter, the third port of the circulator is configured to be coupled to an input port of a receiver filter, and the input port of the second isolator is configured to be coupled to an output port of the receiver filter, and the transmitter filter and the receiver filter are located outside the single circulator plate.

15. The system of claim 12, wherein the input port of the first isolator is configured to be coupled to an output port of a transmitter combiner, and the first transmitter and the second transmitter are configured to be coupled to an input port of the transmitter combiner, the transmitter combiner located outside the circulator plate.

16. An antenna coupling unit for routing radio-frequency or microwave signals, the antenna coupling unit comprising:

a single circulator plate and filters;

a circulator formed using the single circulator plate;

one or more isolators formed using the single circulator plate; and a splitter formed using the single circulator plate and coupled to an isolator.

17. The antenna coupling unit of claim 16, wherein the splitter further comprises a pluggable insertion plate.

18. The antenna coupling unit of claim 17, wherein the insertion plate further comprises:

an opening formed along an elongated side of the insertion plate; and a plurality of pins located within the opening and protruding laterally from the elongated side of the insertion plate.

19. The antenna coupling unit of claim 16, wherein the splitter is configured to split signals received from the isolator into a first portion and a second portion, and transmit the first portion of the signals to a first receiver and the second portion of the signals to a second receiver.

* * * * *